(12) United States Patent
Hoover

(10) Patent No.: US 8,836,645 B2
(45) Date of Patent: Sep. 16, 2014

(54) TOUCH INPUT INTERPRETATION

(75) Inventor: Paul Armistead Hoover, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 917 days.

(21) Appl. No.: 12/330,525

(22) Filed: Dec. 9, 2008

(65) Prior Publication Data

US 2010/0141589 A1 Jun. 10, 2010

(51) Int. Cl.
*G06F 3/041* (2006.01)

(52) U.S. Cl.
USPC .......................................... 345/173; 715/863

(58) Field of Classification Search
CPC ..... G06F 3/041; G06F 3/0412; G06F 3/0416; G06F 3/0485; G06F 3/0488; G06F 3/04883; G06F 2203/04104; G06F 2203/04106
USPC .................. 345/173–177, 179–183; 715/863
See application file for complete search history.

(56) References Cited

U.S. PATENT DOCUMENTS

| | | | | |
|---|---|---|---|---|
| 5,543,591 A * | 8/1996 | Gillespie et al. | ........... | 178/18.03 |
| 5,748,926 A * | 5/1998 | Fukuda et al. | ................. | 715/863 |
| 5,880,411 A * | 3/1999 | Gillespie et al. | ........... | 178/18.01 |
| 6,208,330 B1 * | 3/2001 | Hasegawa et al. | ............. | 345/173 |
| 6,323,846 B1 * | 11/2001 | Westerman et al. | .......... | 345/173 |
| 6,380,931 B1 | 4/2002 | Gillespie et al. | | |
| 6,611,258 B1 * | 8/2003 | Tanaka et al. | ................. | 345/179 |
| 6,903,722 B2 * | 6/2005 | Ohmori et al. | ................. | 345/156 |
| 6,947,032 B2 * | 9/2005 | Morrison et al. | ............. | 345/173 |
| 7,190,348 B2 * | 3/2007 | Kennedy et al. | ............. | 345/168 |
| 7,649,524 B2 * | 1/2010 | Haim et al. | ................... | 345/173 |
| 7,847,789 B2 * | 12/2010 | Kolmykov-Zotov et al. | . | 345/173 |
| 8,134,536 B2 * | 3/2012 | Hsu et al. | ...................... | 345/173 |
| 8,169,421 B2 * | 5/2012 | Wright et al. | ................. | 345/179 |

(Continued)

OTHER PUBLICATIONS

"Apple wants to Teach us Multi-Touch Gesture Language", Retrieved at <<http://www.unwiredview.com/2008/07/03/apple-wants-to-teach-us-multi-touch-gesture-language/>>, Nov. 7, 2008, pp. 8.

(Continued)

*Primary Examiner* — Jason Mandeville
(74) *Attorney, Agent, or Firm* — Jeremy Snodgrass; Judy Yee; Micky Minhas

(57) ABSTRACT

A method of operating a touch display includes interpreting a touch input on the touch display as a first kind of gesture if a source of the touch input is of a first type and a parameter of the touch input is below a first threshold. The touch input is interpreted as a second kind of gesture if the source is of the first type and the parameter of the touch input is above the first threshold. The touch input is interpreted as the first kind of gesture if the source is of a second type and the parameter of the touch input is below a second threshold, the second threshold being different than the first threshold. The touch input is interpreted as the second kind of gesture if the source is of the second type and the parameter of the touch input is above the second threshold.

15 Claims, 4 Drawing Sheets

(56) References Cited

U.S. PATENT DOCUMENTS

| | | | |
|---|---|---|---|
| 8,469,810 B2* | 6/2013 | Nakanishi et al. | 463/37 |
| 2002/0080123 A1* | 6/2002 | Kennedy et al. | 345/173 |
| 2006/0007174 A1 | 1/2006 | Shen | |
| 2006/0227116 A1* | 10/2006 | Zotov et al. | 345/173 |
| 2007/0242056 A1* | 10/2007 | Engelhardt et al. | 345/173 |
| 2007/0291009 A1 | 12/2007 | Wright et al. | |
| 2008/0001925 A1 | 1/2008 | XiaoPing | |
| 2008/0165140 A1 | 7/2008 | Christie et al. | |
| 2008/0174570 A1 | 7/2008 | Jobs et al. | |
| 2008/0231610 A1 | 9/2008 | Hotelling et al. | |
| 2009/0006958 A1* | 1/2009 | Pohjola et al. | 715/710 |

OTHER PUBLICATIONS

Olwal, et al., "Rubbing and Tapping for Precise and Rapid Selection on Touch-Screen Displays", Retrieved at <<http://www.csc.kth.se/~alx/projects/research/rubbing/olwal_rubbing_tapping_chi_2008.pdf>>, Proceedings of CHI 2008 (SIGCHI Conference on Human Factors in Computing Systems), Florence, Italy, Apr. 5-10, 2008, pp. 295-304.

Moscovich, Tomer, "Principles and Applications of Multi-Touch Interaction", Retrieved at <<http://www.cs.brown.edu/~tm/papers/moscovich_dissertation.pdf>>, May 2007, pp. 114.

* cited by examiner

TOUCH INPUT INTERPRETATION

BACKGROUND

A touch display is a display that serves the dual function of visually presenting information and receiving user input. Touch displays may be utilized with a variety of different devices to provide a user with an intuitive input mechanism that can be directly linked to information visually presented by the touch display. A user may use touch input to push soft buttons, turn soft dials, size objects, orientate objects, or perform a variety of different inputs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Touch input interpretation is disclosed. A touch input is interpreted as a first kind of gesture if a source of the touch input is of a first type and a parameter of the touch input is below a first threshold. The touch input is interpreted as a second kind of gesture if the source is of the first type and the parameter of the touch input is above the first threshold. The touch input is interpreted as the first kind of gesture if the source is of a second type and the parameter of the touch input is below a second threshold, the second threshold being different than the first threshold. The touch input is interpreted as the second kind of gesture if the source is of the second type and the parameter of the touch input is above the second threshold.

DETAILED DESCRIPTION

Figure 1:
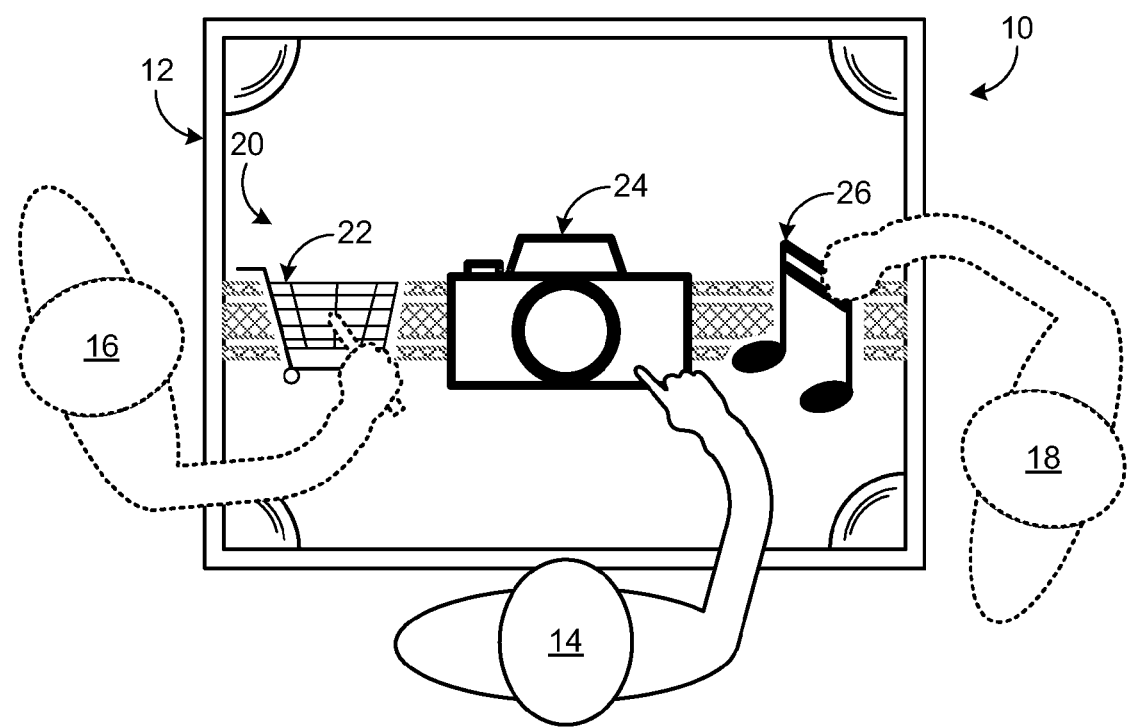
FIG. 1 shows a nonlimiting computing device configured to implement touch input interpretation in accordance with the present disclosure.

FIG. 1 somewhat schematically shows a computing device 10. Computing device 10 includes a touch display 12 that is configured to visually present images to a user (e.g., user 14, user 16, and/or user 18) and to receive and process touch input from the user. In the illustrated embodiment, computing device 10 takes the form of a surface computing device. However, it is to be understood that the present disclosure is not limited to surface computing devices. The herein disclosed methods and processes may be implemented on virtually any computing system having a touch display.

Computing device 10 is shown visually presenting an application-launching user interface 20 that includes a plurality of icons that correspond to different applications that the computing device is configured to run. Application-launching user interface 20 is shown displaying a shopping cart icon 22, a camera icon 24, and a musical note icon 26. Such icons may respectively correspond to a shopping application, a photo-organizing application, and a music-organizing application. The icons are selectable items which may be selected by touch input from the user. Furthermore, the icons may be scrolled across touch display 12, so that other icons may be brought into view.

While described here in the context of an application-launching user interface visually presenting icons, it is to be understood that a touch display may visually present one or more other types of items. The present disclosure is compatible with all such items. Nonlimiting examples of such items include words in a list, points on a map, and photos in an array, among others.

A user may perform touch inputs with different body parts, tools, or combinations thereof. As nonlimiting examples, FIG. 1 shows user 14 performing a touch input with a single pointed finger, user 16 performing a touch input with a stylus, and user 18 performing a touch input with a first. As described in more detail below, touch inputs from different sources (e.g., pointed finger, stylus, first, etc.) may be interpreted differently. In particular, different thresholds may correspond to different types of sources performing touch inputs, and a touch input may be interpreted as different gestures depending on how a parameter of the touch input relates to its corresponding threshold.

Figure 2:
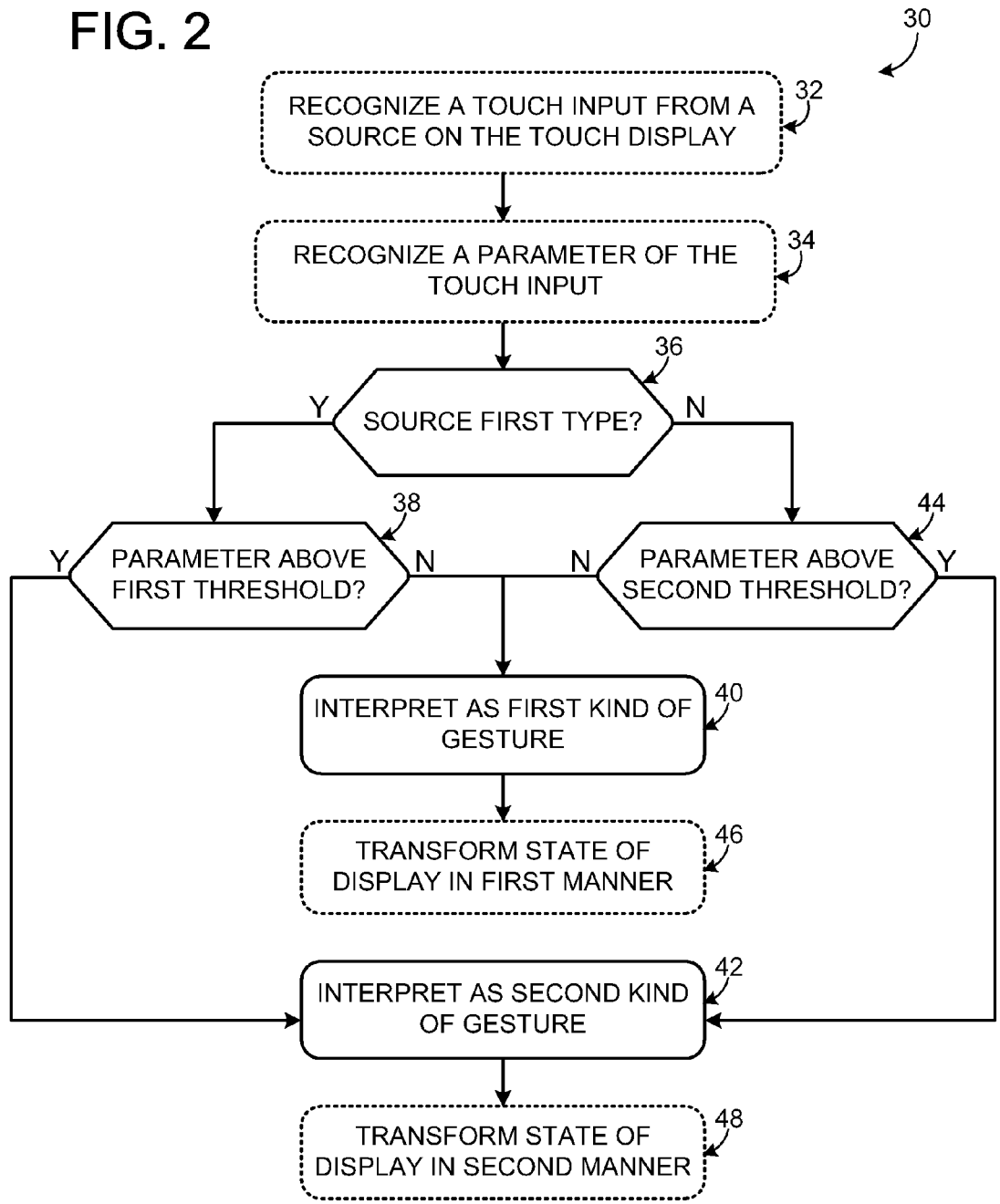
FIG. 2 shows a method of operating a touch display in accordance with an embodiment of the present disclosure.

Turning to FIG. 2, an example method 30 of operating a touch display is shown. At 32, method 30 includes recognizing a touch input on a touch display. The touch input may be performed by a source, such as a finger, a stylus, a first, a blob, or another suitable object. The touch input may be recognized in a variety of different ways depending on the type of touch display being used. As an example, the touch display may be a capacitive touch screen, in which case recognizing the touch input may include recognizing a change in capacitance of the touch display. As another example, the touch display may be part of a surface computing device that uses infrared light to track user input, in which case recognizing the touch input may include recognizing a change in an amount of infrared light reflecting from a surface of the touch display. Other touch computing systems may recognize touch input in a different manner without departing from the scope of this disclosure.

At 34, method 30 includes recognizing a parameter of the touch input. As nonlimiting examples, a distance, a duration, a velocity, or an acceleration of the touch input may be recognized. The types of parameters that may be recognized may vary between different types of touch displays.

At 36, method 30 includes determining if the source is of a first type or if the source is of a second type. Example types of sources include, but are not limited to, a finger, a stylus, a hand, and an unidentified object. While this step is described as being a binary decision selecting between two options, it is to be understood that the herein described methodology easily expands to three or more options. For example, while the described process may decide if the touch input is performed by a finger or a stylus, for example, a process that decides if the touch input is performed by a finger or a stylus or a first or any number of different types of sources is within the scope of this disclosure.

The type of source performing the touch input may be determined in a variety of different ways depending on the type of touch display being used. A capacitive touch screen may determine the type of the source by the relative influence it has on measured capacitance. A surface computing device may determine the type of source by the shape and/or magnitude of light reflected when the touch input is performed. Other touch computing systems may determine the type of the source in a different manner without departing from the scope of this disclosure.

One or more parameters may be used to differentiate between two or more different kinds of gestures the user may be intending to perform with a touch input. For example, a user may intend to tap a selectable item, thus expecting the selectable item to be selected upon completion of the touch input. As another example, a user may intend to move a touch input across an item, thus expecting the item to scroll with the touch input as the touch input is being performed. However, even if a user intends to perform a tap gesture, the user may accidentally move the touch input across the item. Therefore, a distance of the touch input (i.e., how far the touch input moves across the touch display from the beginning of the touch input to the end of the touch input) may be used as a threshold in determining if a tap gesture or a scroll gesture is intended. If the distance of the touch input is relatively small, it may be assumed that any movement is accidental and that a tap gesture is intended. If the distance of the touch input is relatively large, it may be assumed that the movement is intentional and that a scroll gesture is intended. While the above example uses a distance of a touch input as an example threshold that may be used to differentiate between a tap and a scroll gesture, it is to be appreciated that other parameters may be used to differentiate between other gestures.

At 38 of method 30 it is determined if a parameter of the touch input is above or below a first threshold. For example, if the parameter of interest is a distance of the touch input, the distance of the touch input may be compared to a first distance threshold. The first distance threshold may be selected so as to differentiate between two different types of gestures the user may be intending to perform with the touch input (e.g., a tap gesture and a scroll gesture).

At 40, method 30 includes interpreting a touch input on the touch display as a first kind of gesture if a source of the touch input is of a first type and a parameter of the touch input is below a first threshold. Using the above example, the touch input may be interpreted to be a tap gesture if a distance of the touch input is below a distance threshold (e.g., 5 pixels) and a source of the touch input is a finger.

Figure 3:
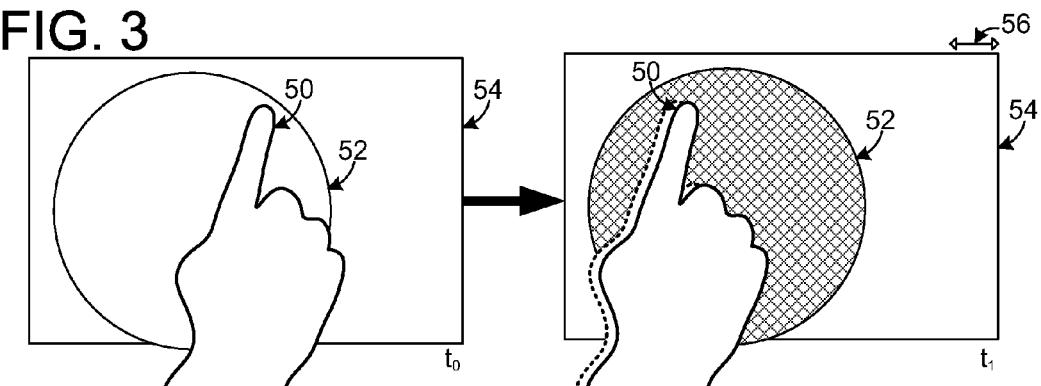
FIG. 3 shows an example usage scenario in accordance with the present disclosure.
Figure 4:
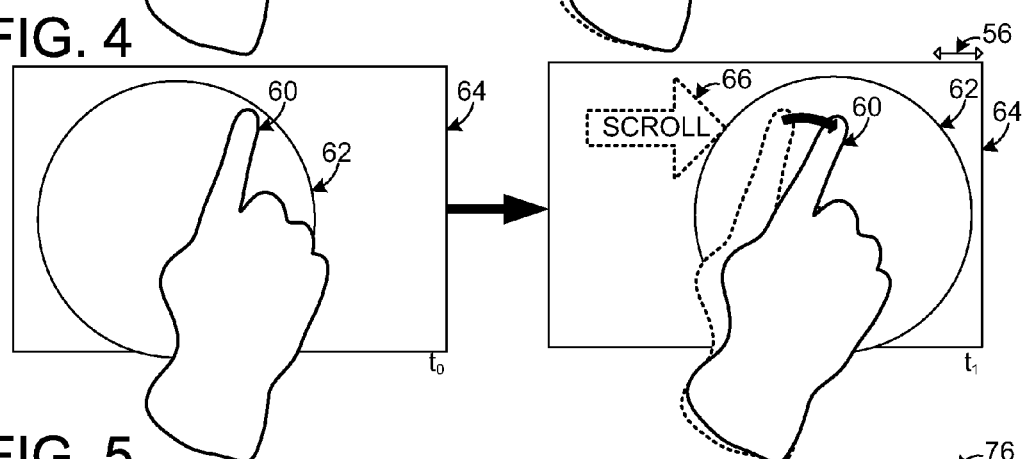
FIG. 4 shows another example usage scenario in accordance with the present disclosure.

FIG. 3 shows an example of such a scenario. In particular, FIG. 3 shows a source in the form of a finger 50 directing a touch input towards an item 52 displayed by a touch display 54 at time $t_0$. In this example, the touch input moves slightly across the touch display at time $t_1$. However, the distance of the touch input is less than a distance threshold 56, which is schematically shown in FIGS. 3 and 4. Therefore, the touch input is interpreted as a tap gesture, and item 52 is selected, as schematically depicted by shading of item 52 at time $t_1$.

Turning back to FIG. 2, at 42, method 30 includes interpreting the touch input as a second kind of gesture if the source of the touch input is of the first type and the parameter of the touch input is above the first threshold. Using the above example, the touch input may be interpreted to be a scroll gesture if a distance of the touch input is above a distance threshold and a source of the touch input is a finger.

FIG. 4 shows an example of such a scenario. In particular, FIG. 4 shows a source in the form of a finger 60 directing a touch input towards an item 62 displayed by a touch display 64 at time $t_0$. In this example, the touch input moves a relatively greater distance across the touch display at time $t_1$. In this case, the distance of the touch input is greater than the distance threshold 56. Therefore, the touch input is interpreted as a scroll gesture, and item 52 is scrolled across touch display 64, as schematically shown by arrow 66 at time $t_1$.

Some touch displays may receive touch input from two or more different types of sources. Some sources may be considered to be more accurate than other sources. As an example, a touch input from a stylus may be considered to be more accurate than a touch input from a finger. As another example, a touch input from a finger may be considered to be more accurate than a touch input from an unidentified object.

Different thresholds can be used with different sources when determining what kind of gesture a user intends to perform with a touch input. For example, the distance of a touch input may be used to differentiate between a tap and a scroll gesture whether the source is a stylus, a finger, or an unidentified object. Furthermore, the distance threshold may be a different magnitude for each different type of source. Because a stylus is a relatively precise source, a distance threshold corresponding to the stylus (e.g., 3 pixels) may be smaller than a distance threshold corresponding to a less precise finger source (e.g., 5 pixels). Likewise, a distance threshold for a finger source may be smaller than a distance threshold for an unidentified object source (e.g., 10 pixels). While described in the context of distance thresholds used to differentiate between tap and scroll gestures, it is to be understood that a variety of different parameters may be used to differentiate a variety of different gestures. Furthermore, it is to be understood that the magnitudes of the various thresholds may set to assist in differentiating one kind of gesture from another. The example magnitudes provided herein are not limiting.

Turning back to FIG. 2, if at 36 it is determined that the source is not of the first type, the process moves to 44, where it is determined if a parameter of the touch input is above or below a second threshold. For example, if the parameter of interest is a distance of the touch input, the distance of the touch input may be compared to a second distance threshold, greater than or less than the first distance threshold. The second distance threshold may be selected so as to differentiate between two different types of gestures the user may be intending to perform with the touch input (e.g., a tap gesture and a scroll gesture), while accounting for accuracy differences between sources of the first type and sources of the second type.

At 40, method 30 includes interpreting the touch input as the first kind of gesture if the source is of a second type and the parameter of the touch input is below a second threshold, the second threshold being different than the first threshold. Using the above example, the touch input may be interpreted to be a tap gesture if a distance of the touch input is below a distance threshold and a source of the touch input is an unidentified object.

Figure 5:
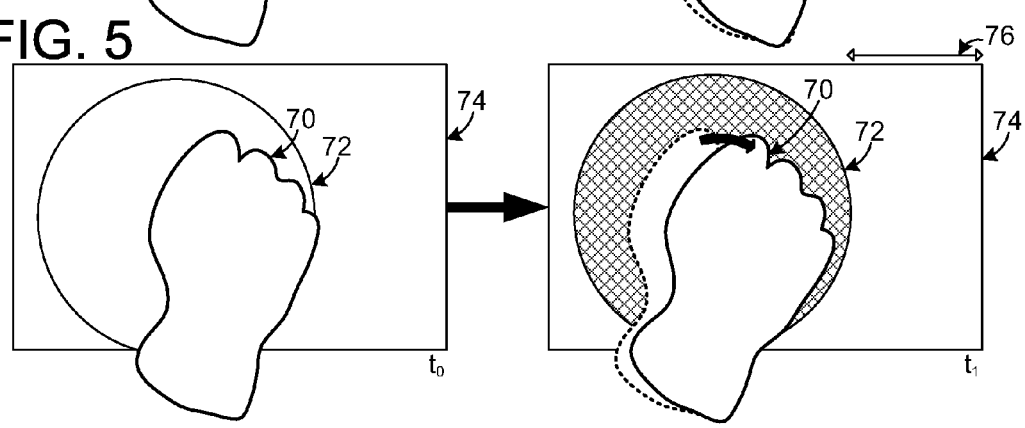
FIG. 5 shows another example usage scenario in accordance with the present disclosure.
Figure 6:
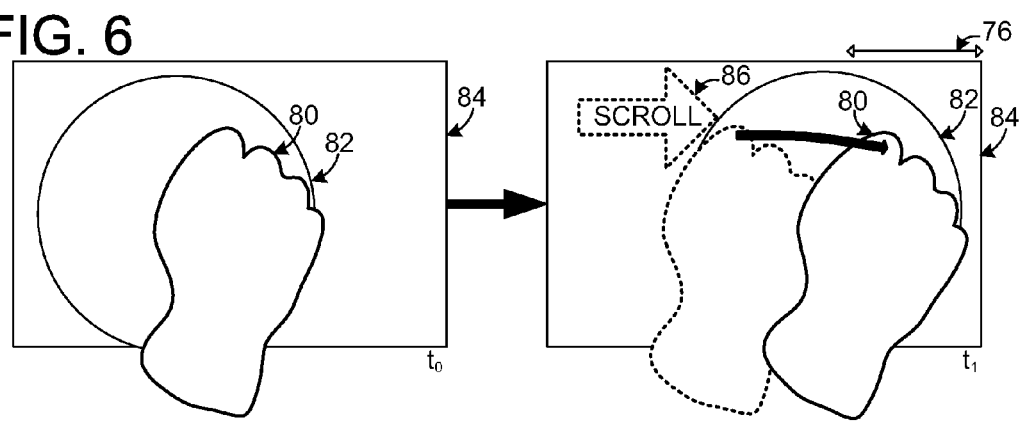
FIG. 6 shows another example usage scenario in accordance with the present disclosure.

FIG. 5 shows an example of such a scenario. In particular, FIG. 5 shows a source in the form of a first 70 directing a touch input towards an item 72 displayed by a touch display 74 at time $t_0$. In this example, the touch input moves across the touch display at time $t_1$. However, the distance of the touch input is less than a distance threshold 76, which is schematically shown in FIGS. 5 and 6. It is to be noted that distance threshold 76 of FIGS. 5 and 6 (corresponding to an unidentified object source) is greater than distance threshold 56 of FIGS. 3 and 4 (corresponding to a finger source). Therefore, in this example, an unidentified object, such as first 70, can move a greater distance than a finger before triggering a scroll gesture. As such, even though a distance of the touch input of FIG. 5 is at least equal to a distance of the touch input of FIG. 4, the touch input is interpreted as a tap gesture, and item 72 is selected, as schematically depicted by shading of item 72 at time $t_1$.

It is to be understood that first 70 may be considered an unidentified object if touch display 74 and/or a corresponding computing device is not configured to specifically recognize a first as a specific type of source. For example, some touch displays may be configured to recognize a single pointed finger as a specific source without being able to recognize other sources as being of a particular type. In such embodiments, these unidentified objects may be referred to as non-finger sources, even if such sources consist of one or more fingers (e.g., a first, a group of two or more fingers, a finger and a sleeve, etc.).

Turning back to FIG. 2, at 42, method 30 includes interpreting the touch input as the second kind of gesture if the source is of the second type and the parameter of the touch input is above the second threshold. Using the above example, the touch input may be interpreted to be a scroll gesture if a distance of the touch input is above a distance threshold and a source of the touch input is an unidentified object.

FIG. 6 shows an example of such a scenario. In particular, FIG. 6 shows a source in the form of a first 80 directing a touch input towards an item 82 displayed by a touch display 84 at time $t_0$. In this example, the touch input moves across the touch display at time $t_1$. In this case, the distance of the touch input is greater than the distance threshold 76. Therefore, the touch input is interpreted as a scroll gesture, and item 82 is scrolled across touch display 84, as schematically shown by arrow 86 at time $t_1$.

Turning back to FIG. 2, at 46 method 30 includes transforming a state of the touch display in a first manner if the touch input is interpreted as the first kind of gesture. At 48, method 30 includes transforming a state of the touch display in a second manner if the touch input is interpreted as the second kind of gesture. The first manner of transformation is different than the second manner of transformation. In other words, using the above example, the touch display visually presents different images responsive to tap and scroll gestures. For example, a scroll gesture may cause the display to visually present one or more items scrolling horizontally across the touch display, vertically across the touch display, or in any other direction. On the other hand, a tap gesture may not cause a tapped item to move, but instead launch a graphical user interface corresponding to the item, modify the appearance of the item, grow or shrink the item, animate the item, or otherwise visually indicate selection of the item.

Figure 7:
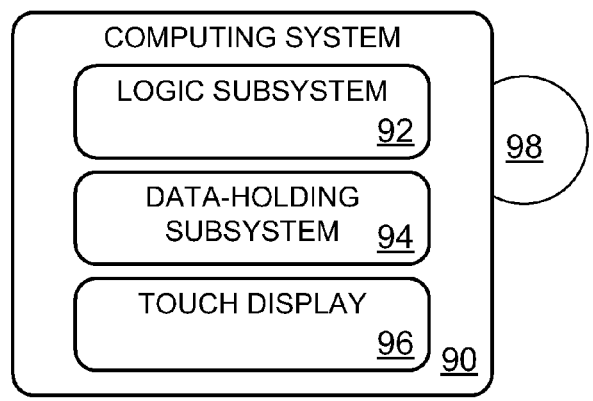
FIG. 7 shows a nonlimiting computing device configured to implement touch input interpretation in accordance with the present disclosure.

In some embodiments, the above described methods and processes may be tied to a computing system. As an example, FIG. 7 schematically shows a computing system 90 that may perform one or more of the above described methods and processes. Computing system 90 includes a logic subsystem 92, a data-holding subsystem 94, a touch display 96, and optionally other components not shown in FIG. 7. Computing system 90 may be a surface computer, tablet computer, mobile communications device, personal data assistant, desktop computer with a touch screen, laptop computer with a touch screen, or virtually any other computing device that utilizes a touch display.

Logic subsystem 92 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 94 may include one or more physical devices configured to hold data and/or instructions executable by the logic subsystem to implement the herein described methods and processes. When such methods and processes are implemented, the state of data-holding subsystem 94 may be transformed (e.g., to hold different data). Data-holding subsystem 94 may include removable media and/or built-in devices. Data-holding subsystem 94 may include optical memory devices, semiconductor memory devices, and/or magnetic memory devices, among others. Data-holding subsystem 94 may include devices with one or more of the following characteristics: volatile, nonvolatile, dynamic, static, read/write, read-only, random access, sequential access, location addressable, file addressable, and content addressable. In some embodiments, logic subsystem 92 and data-holding subsystem 94 may be integrated into one or more common devices, such as an application specific integrated circuit or a system on a chip.

FIG. 7 also shows an aspect of the data-holding subsystem in the form of computer-readable removable media 98, which may be used to store and/or transfer data and/or instructions executable to implement the herein described methods and processes.

Touch display 96 may be used to present a visual representation of data held by data-holding subsystem 94. As the herein described methods and processes change the data held by the data-holding subsystem, and thus transform the state of the data-holding subsystem, the state of touch display 96 may likewise be transformed to visually represent changes in the underlying data. Touch display 96 may be combined with logic subsystem 92 and/or data-holding subsystem 94 in a shared enclosure, or touch display 96 may be a peripheral display device.

Figure 8:
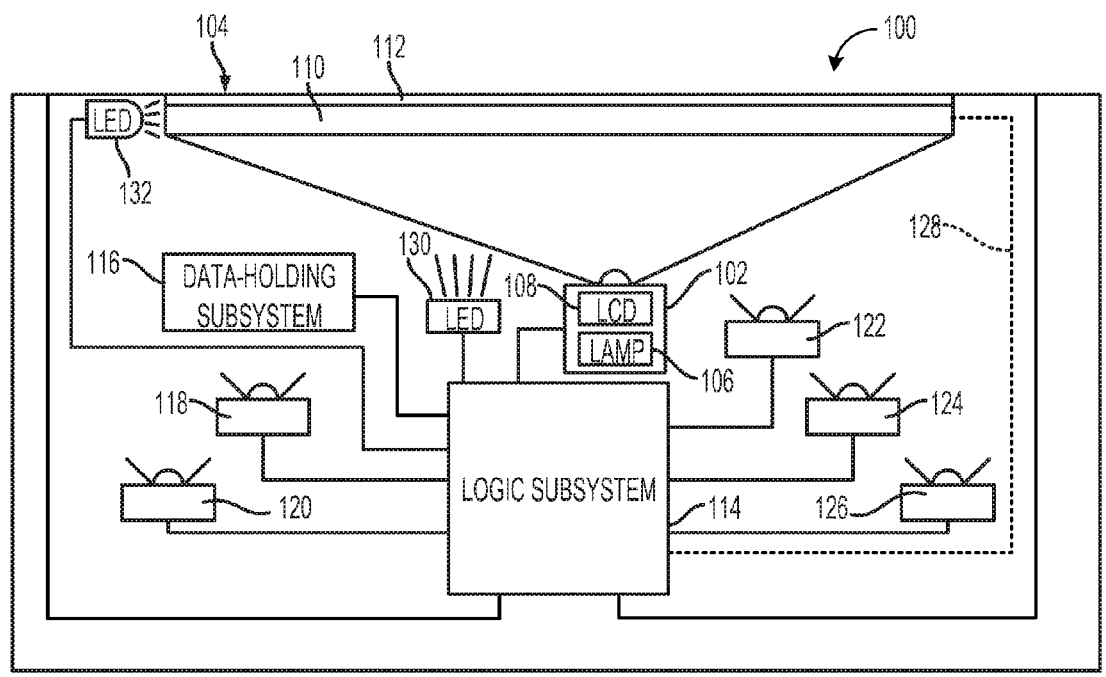
FIG. 8 shows a nonlimiting surface computing device configured to implement touch input interpretation in accordance with the present disclosure.

FIG. 8 shows a non-limiting example of a surface computing system 100 capable of executing the methods described herein. Surface computing system 100 includes a projection display system having a rear projector 102 that can project images onto display surface 104. Rear projector 102 can include a light source 106, such as the depicted lamp, an LED array, or other suitable light source. Rear projector 102 may also include an image-producing element 108, such as the depicted LCD (liquid crystal display), an LCOS (liquid crystal on silicon) display, a DLP (digital light processing) display, or any other suitable image-producing element. Display surface 104 may include a clear, transparent portion 110, such as a sheet of glass, and a diffuser screen layer 112 disposed on top of the clear, transparent portion 110. In some embodiments, an additional transparent layer (not shown) may be disposed over diffuser screen layer 112 to provide a smooth look and feel to the display surface. In this way, transparent portion 110 and diffuser screen layer 112 can form a non-limiting example of a touch-sensitive region of display surface 104.

Continuing with FIG. 8, surface computing system 100 may further include a logic subsystem 114 and data-holding subsystem 116 operatively coupled to the logic subsystem 114, as described above with reference to logic subsystem 92 and data-holding subsystem 94 of FIG. 7.

To sense objects that are contacting or near to display surface 104, surface computing system 100 may include one or more image capture devices (e.g., sensor 118, sensor 120, sensor 122, sensor 124, and sensor 126) configured to capture an image of the backside of display surface 104, and to provide the image to logic subsystem 114. The diffuser screen layer 112 can serve to reduce or avoid the imaging of objects that are not in contact with or positioned within a few millimeters or other suitable distance of display surface 104, and therefore helps to ensure that at least objects that are touching transparent portion 110 of display surface 104 are detected by the image capture devices.

These image capture devices may include any suitable image sensing mechanism. Examples of suitable image sensing mechanisms include but are not limited to CCD and CMOS image sensors. Further, the image sensing mechanisms may capture images of display surface 104 at a sufficient frequency to detect motion of an object across display surface 104. Display surface 104 may alternatively or further include an optional capacitive, resistive or other electromagnetic touch-sensing mechanism, which may communicate touch input to the logic subsystem via a wired or wireless connection 128.

The image capture devices may be configured to detect reflected or emitted energy of any suitable wavelength, including but not limited to infrared and visible wavelengths. To assist in detecting objects placed on display surface 104, the image capture devices may further include an additional light source, such as one or more light emitting diodes (LEDs). FIG. 8 shows an infrared light source 130 and an infrared light source 132 configured to produce infrared light. Light from such light sources may be reflected by objects contacting or near display surface 104 and then detected by the image capture devices. The use of infrared LEDs as opposed to visible LEDs may help to avoid washing out the appearance of projected images on display surface 104.

One or more of infrared light source 130 and/or infrared light source 132 may be positioned at any suitable location within surface computing system 100. In the example of FIG. 8, an infrared light source 132 may be placed along a side of display surface 104. In this location, light from the infrared light source can travel through display surface 104 via internal reflection, while some light can escape from display surface 104 for reflection by an object on the display surface 104. In other examples, an infrared light source 130 may be placed beneath display surface 104 so as to pass emitted light through display surface 104.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device, comprising:
   a touch display;
   a logic subsystem operatively coupled to the touch display; and
   a data-holding subsystem holding instructions executable by the logic subsystem to:
      recognize a touch input from a source on the touch display, the touch input having an initial point of contact on the touch display and a final point of contact on the touch display;
      determine if the source is of a first type or if the source is of a second type;
      interpret the touch input as a tap gesture if the source is of the first type and a distance between the initial point of contact and the final point of contact is less than a first threshold distance;
      interpret the touch input as a scroll gesture if the source is of the first type and the distance between the initial point of contact and the final point of contact is more than the first threshold distance;
      interpret the touch input as the tap gesture if the source is of the second type and the distance between the initial point of contact and the final point of contact is less than a second threshold distance, the second threshold distance having a greater magnitude than the first threshold distance if the first type of source has a smaller touch contact area than the second type of source, and the second threshold distance having a lesser magnitude than the first threshold distance if the first type of source has a larger contact area than the second type of source; and
      interpret the touch input as the scroll gesture if the source is of the second type and the distance between the initial point of contact and the final point of contact is more than the second threshold distance.

2. The computing device of claim 1, where the touch display comprises:
   a display surface;
   a rear projector configured to project images at the display surface;
   a light source positioned to direct infrared reference light through the display surface; and
   a sensor operatively positioned to detect reference light reflected from a touch input on the display surface and back through the display surface.

3. The computing device of claim 1, where the touch display includes a capacitive touch screen.

4. The computing device of claim 1, where a source of the first type includes a finger and a source of the second type includes a stylus or an unidentified object.

5. A method of operating a touch display, the method comprising:
   interpreting a touch input on the touch display as a tap gesture if a source of the touch input is of a first type and a distance parameter of movement of the touch input from an initial point of contact on the touch display to a final point of contact on the touch display is a non-zero distance below a first distance threshold;
   interpreting the touch input as a scroll gesture if the source is of the first type and the distance parameter of movement of the touch input from the initial point of contact on the touch display to the final point of contact on the touch display is above the first distance threshold;
   interpreting the touch input as the tap gesture if the source is of a second type and the distance parameter of movement of the touch input from the initial point of contact on the touch display to the final point of contact on the touch display is a non-zero distance below a second distance threshold, the second distance threshold having a greater value than the first distance threshold if the first type of source has a smaller touch contact area than the second type of source, and the second distance threshold having a lesser value than the first distance threshold if the first type of source has a larger touch contact area than the second type of source; and interpreting the touch input as the scroll gesture if the source is of the second type and the distance parameter of movement of the touch input from the initial point of contact on the touch display to the final point of contact on the touch display is above the second distance threshold.

6. The method of claim 5, where a source of the first type includes a finger.

7. The method of claim 6, where a source of the second type includes a nonfinger.

8. The method of claim 7, where the nonfinger includes a stylus.

9. The method of claim 7, where the nonfinger includes an unidentified object.

10. The method of claim 5, further comprising:
recognizing the touch input from the source on the touch display;
recognizing a parameter of the touch input; and
determining if the source is of the first type or if the source is of the second type.

11. The method of claim 5, further comprising transforming a state of the touch display in a first manner if the touch input is interpreted as the tap gesture and transforming a state of the touch display in a second manner if the touch input is interpreted as the scroll gesture, the first manner of transformation being different than the second manner of transformation.

12. A method of operating a touch display, the method comprising:

recognizing a touch input from a source on the touch display;

recognizing a distance of the touch input between an initial point of contact of the source on the touch display and a final point of contact of the source on the touch display;

determining if the source is a finger or if the source is a nonfinger;

interpreting the touch input as a tap gesture if the source is a finger and the distance of the touch input is below a first distance threshold;

interpreting the touch input as a scroll gesture if the source is a finger and the distance of the touch input is above the first distance threshold;

interpreting the touch input as a tap gesture if the source is a nonfinger and the distance of the touch input is below a second distance threshold, the second distance threshold having a greater value than the first distance threshold if the finger has a smaller touch contact area than the nonfinger, and the second distance threshold having a lesser value than the first distance threshold if the finger has a larger touch contact area than the nonfinger; and interpreting the touch input as a scroll gesture if the source is a nonfinger and the distance of the touch input is above the second distance threshold.

13. The method of claim 12, where the nonfinger includes a stylus.

14. The method of claim 12, where the nonfinger includes an unidentified object.

15. The method of claim 12, further comprising transforming a state of the touch display in a first manner if the touch input is interpreted as a tap gesture and transforming a state of the touch display in a second manner if the touch input is interpreted as a scroll gesture, the first manner of transformation being different than the second manner of transformation.

\* \* \* \* \*